United States Patent
Oowaki et al.

(10) Patent No.: US 11,370,109 B2
(45) Date of Patent: Jun. 28, 2022

(54) INDUSTRIAL ROBOT AND REACH EXTENDING METHOD THEREFOR

(71) Applicant: FANUC CORPORATION, Yamanashi (JP)

(72) Inventors: Morio Oowaki, Yamanashi (JP); Tomoyuki Motokado, Yamanashi (JP); Toshihiko Inoue, Yamanashi (JP); Takayuki Iida, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 15 days.

(21) Appl. No.: 16/808,678

(22) Filed: Mar. 4, 2020

(65) Prior Publication Data

US 2020/0338718 A1 Oct. 29, 2020

(30) Foreign Application Priority Data

Apr. 25, 2019 (JP) .............................. JP2019-084616

(51) Int. Cl.
- *B25J 19/00* (2006.01)
- *B25J 9/00* (2006.01)
- *B25J 17/02* (2006.01)

(52) U.S. Cl.
CPC ......... *B25J 9/0009* (2013.01); *B25J 19/0075* (2013.01); *B25J 17/025* (2013.01)

(58) Field of Classification Search
CPC .... B25J 19/0075; B25J 9/0009; B25J 17/025; B25J 19/0025; B25J 19/0029; B25J 19/0033; B25J 18/04; B25J 9/08
See application file for complete search history.

(56) References Cited

U.S. PATENT DOCUMENTS

| 4,089,427 A | 5/1978 | Pardo et al. |
| 7,703,349 B2 * | 4/2010 | Nihei .................. H05K 9/0098 74/490.02 |

(Continued)

FOREIGN PATENT DOCUMENTS

| CN | 106272458 A * | 1/2017 |
| EP | 1 453 170 A2 | 9/2004 |

(Continued)

OTHER PUBLICATIONS

Japanese Office Action dated Sep. 14, 2021, in connection with corresponding JP Application No. 2019-084616A (12 pp., including machine-generated English translation).

(Continued)

*Primary Examiner* — Jake Cook
*Assistant Examiner* — Gregory Robert Weber
(74) *Attorney, Agent, or Firm* — Maier & Maier, PLLC

(57) ABSTRACT

An industrial robot includes: a first-member and a second-member that are rotatable about a particular axis and that each have a hollow portion extending along the axis; a cylindrical member inserted into the hollow portions along the axis, and fixed to the first-member; and a wire disposed in a cylindrical gap between the cylindrical member, the first-member, and the second-member, the wire having a length that enables rotation between the first-member and the second-member and having one end fixed to the first-member and another end fixed to the second-member. The second-member includes a first-portion rotatably supported by the first-member, a second-portion that fixes the end of the wire, and a third portion serially connected between the second-portion and the first-portion, and the third portion has an inner circumferential surface that faces the gap and has been subjected to a friction reducing process.

9 Claims, 8 Drawing Sheets

(56) References Cited

U.S. PATENT DOCUMENTS

| | | | |
|---|---|---|---|
| 9,346,174 B2* | 5/2016 | Adachi | B25J 18/00 |
| 9,764,463 B2* | 9/2017 | Hahakura | B25J 19/0029 |
| 10,576,627 B1 | 3/2020 | Frei et al. | |
| 2004/0179900 A1 | 9/2004 | Uematsu et al. | |
| 2006/0101936 A1 | 5/2006 | Inoue et al. | |
| 2006/0294628 A1 | 12/2006 | Iwai et al. | |
| 2008/0315820 A1 | 12/2008 | Inoue et al. | |
| 2009/0139364 A1 | 6/2009 | Forslund et al. | |
| 2013/0213170 A1 | 8/2013 | Kim et al. | |
| 2014/0020498 A1 | 1/2014 | Adachi | |
| 2014/0102240 A1* | 4/2014 | Inada | B25J 17/0283 |
| | | | 74/490.02 |
| 2015/0190934 A1* | 7/2015 | Chiu | B25J 9/08 |
| | | | 74/490.01 |
| 2016/0089778 A1 | 3/2016 | Yokota et al. | |
| 2016/0089779 A1* | 3/2016 | Hahakura | B25J 9/102 |
| | | | 74/490.02 |
| 2016/0114491 A1* | 4/2016 | Lee | B25J 19/0029 |
| | | | 74/490.06 |
| 2017/0072573 A1 | 3/2017 | Motokado et al. | |
| 2017/0120442 A1 | 5/2017 | Frei et al. | |
| 2017/0282382 A1* | 10/2017 | Inoue | B25J 19/0029 |
| 2018/0099413 A1 | 4/2018 | Naitou et al. | |
| 2018/0333844 A1 | 11/2018 | Inoue et al. | |
| 2019/0077012 A1* | 3/2019 | Inoue | B25J 19/0037 |
| 2020/0298426 A1 | 9/2020 | Ayuzawa et al. | |
| 2021/0308878 A1* | 10/2021 | Yoo | H02G 3/0456 |

FOREIGN PATENT DOCUMENTS

| | | |
|---|---|---|
| EP | 1 625 920 A1 | 2/2006 |
| EP | 1 743 747 A1 | 1/2007 |
| EP | 2 006 056 A1 | 12/2008 |
| EP | 2 711 145 A1 | 3/2014 |
| EP | 3 002 087 A1 | 4/2016 |
| EP | 3 002 089 A2 | 4/2016 |
| EP | 3 439 153 A1 | 2/2019 |
| JP | 2004-276233 A | 10/2004 |
| JP | 2006-051581 A | 2/2006 |
| JP | 2006-289589 A | 10/2006 |
| JP | 3830488 B2 | 10/2006 |
| JP | 3987845 B2 | 10/2007 |
| JP | 2009-000770 A | 1/2009 |
| JP | 4280295 B2 | 6/2009 |
| JP | 2011-176917 A | 9/2011 |
| JP | 2012-240123 A | 12/2012 |
| JP | 2014-018929 A | 2/2014 |
| JP | 2014-143861 A | 8/2014 |
| JP | 2016-068200 A | 5/2016 |
| JP | 2016-068204 A | 5/2016 |
| JP | 2016-215371 A | 12/2016 |
| JP | 2017-048319 A | 3/2017 |
| JP | 2017-056501 A | 3/2017 |
| JP | 2017-056541 A | 3/2017 |
| JP | 2017-060275 A | 3/2017 |
| JP | 2017048319 A * | 3/2017 |
| JP | 2017-187165 A | 10/2017 |
| JP | 2018-062028 A | 4/2018 |
| JP | 2018-080802 A | 5/2018 |
| JP | 2018-188968 A | 11/2018 |
| JP | 2018-192607 A | 12/2018 |
| JP | 2018-197572 A | 12/2018 |
| KR | 10-2007-0101538 A | 10/2007 |
| WO | 2005/061189 A1 | 7/2005 |

OTHER PUBLICATIONS

Japanese Search Report dated Jul. 29, 2021, in connection with corresponding JP Application No. 2019-084616A (27 pp., including machine-generated English translation).

* cited by examiner

INDUSTRIAL ROBOT AND REACH EXTENDING METHOD THEREFOR

CROSS-REFERENCE TO RELATED APPLICATIONS

This application is based on Japanese Patent Application No. 2019-084616, the contents of which are incorporated herein by reference.

FIELD

The present disclosure relates to an industrial robot and a method for extending the reach of an industrial robot.

BACKGROUND

There is a known industrial robot equipped with a hollow wrist element, a hollow arm supporting the wrist element such that the wrist element is rotatable about a particular axis, a cylindrical sleeve member inserted into the arm along the axis up to the inside of the wrist element, and a cable wound along the outer circumference of the sleeve member so as to be connected to a motor inside the wrist element (refer to Japanese Unexamined Patent Application, Publication No. 2018-192607). In this case also, the cable is loosely wound to provide an extra length so that application of an excessive force to the cable is avoided even when the path length is changed by the rotation of the wrist element about the axis relative to the arm.

SUMMARY

This structure is relatively simple but offers high reliability; however, as the wrist element becomes longer in the axis direction and the motor is placed at the distal end of the wrist, the cable length becomes longer, causing the cable to be more susceptible to the influence of its own weight. In other words, there is a higher possibility that the cable would be disproportionately arranged toward the lower side of the sleeve member, causing the behavior of the cable to be unstable when the wrist element is rotated and causing the cable to contact the inner surface of the arm disposed on the outer side.

Thus, it is desirable to maintain the cable in an appropriate state despite extension of the overall length of the wrist element.

According to one aspect, the present disclosure provides an industrial robot that includes: a first member and a second member that are supported so as to be relatively rotatable about a particular axis and that each have a hollow portion extending along the axis; a cylindrical member inserted into the hollow portions of the first member and the second member along the axis, and fixed to the first member; and a wire disposed in a cylindrical gap between the cylindrical member, the first member, and the second member so as to extend along an outer circumferential surface of the cylindrical member, the wire having an extra length that enables relative rotation between the first member and the second member and having one end fixed to the first member and another end fixed to the second member. The second member includes a first portion rotatably supported by the first member, a second portion that fixes the end of the wire, and a cylindrical third portion serially connected between the second portion and the first portion along the axis direction, and the third portion has an inner circumferential surface that faces the gap and has been subjected to a friction reducing process for reducing friction with the wire.

DETAILED DESCRIPTION OF EMBODIMENTS

An industrial robot 1 according to one embodiment of the present disclosure will now be described with reference to the drawings.

Figure 1:
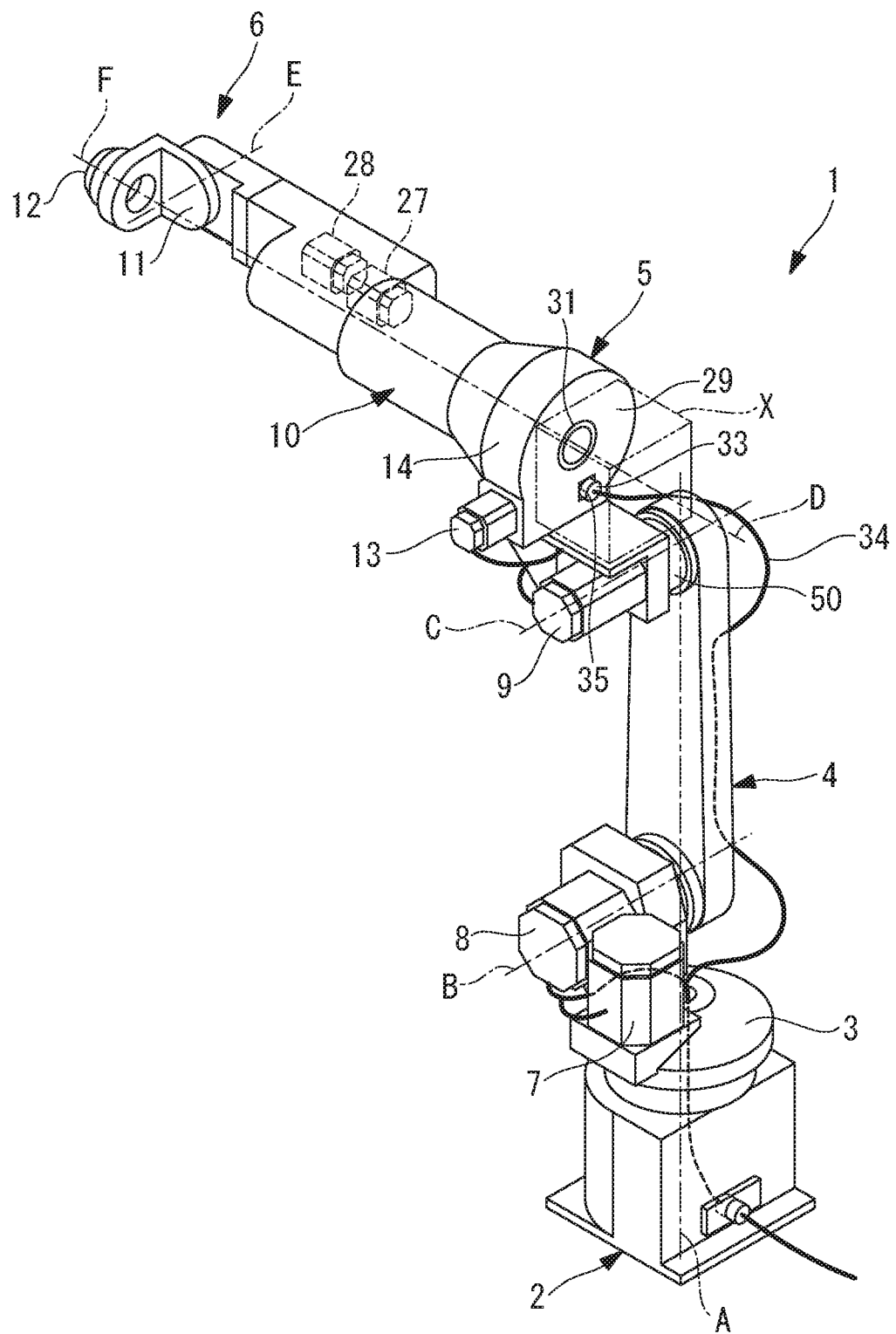
FIG. 1 is a perspective view of an industrial robot according to one embodiment of the present disclosure.

As illustrated in FIG. 1, the industrial robot 1 according to this embodiment is equipped with a rotary barrel 3 supported by a base 2 installed on the floor so that the rotary barrel 3 can rotate about a first axis A perpendicular to the base 2, and a first arm 4 that is supported by the rotary barrel 3 so as to be pivotable about a second axis B. The industrial robot 1 is also equipped with a second arm (first member) 5 supported by a distal end of the first arm 4 so that the second arm 5 can pivot about a third axis C parallel to the second axis B, and a three-axis-structure wrist 6 installed at a distal end of the second arm 5.

A first motor 7 that drives the rotary barrel 3 and a second motor 8 that drives the first arm 4 are fixed to the rotary barrel 3. Reducers (not illustrated) are disposed between the base 2 and the rotary barrel 3 and between the rotary barrel 3 and the first arm 4. The rotations of the first motor 7 and the second motor 8 are reduced by the reducers and transmitted to the rotary barrel 3 and the first arm 4 so that the rotary barrel 3 and the first arm 4 are rotated with larger torques.

A third motor 9 that drives the second arm 5 relative to the first arm 4 is fixed to the second arm 5. The driving force of the third motor 9 is amplified by a reducer 50 disposed between the first arm 4 and the second arm 5, and a large torque generated thereby causes the second arm 5 to pivot relative to the first arm 4.

The wrist 6 is equipped with a first wrist element (second member) 10 that is mounted at the distal end of the second arm 5 and is supported to be rotatable about a fourth axis (longitudinal axis of the second arm 5 or axis) D that is offset with respect to the third axis C and intersects the first axis A. A second wrist element 11 supported to be rotatable about a fifth axis E intersecting the fourth axis D is installed on the distal end side of the first wrist element 10. A third wrist element 12 supported to be rotatable about a sixth axis F serving as the final axis intersecting the fifth axis E is installed on the distal end side of the second wrist element 11.

A fourth motor 13 that drives the first wrist element 10 is fixed to the second arm 5 as with the third motor 9 that drives the second arm 5.

As illustrated in FIG. 1, the second arm 5 is equipped with a second arm base (first member) 14 that is mounted to the distal end of the first arm 4 so as to be pivotable about the third axis C.

Figure 2:
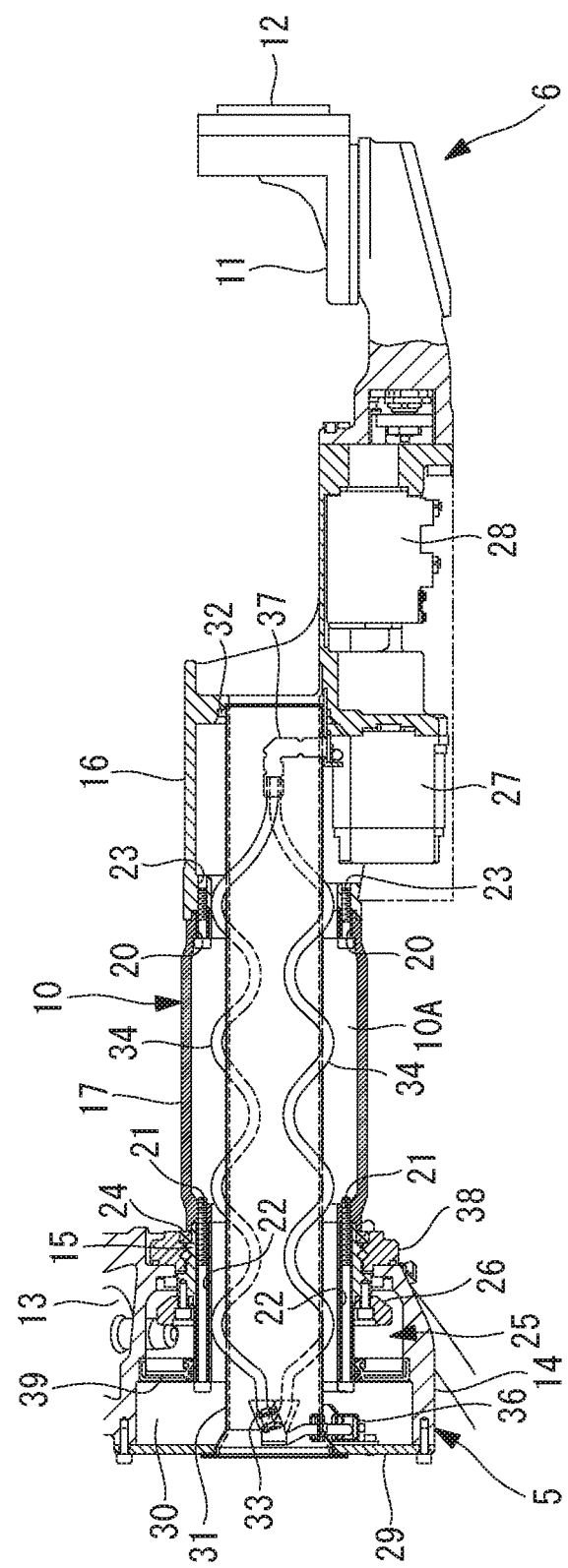
FIG. 2 is a partial vertical sectional view of a second arm and a wrist unit of the industrial robot illustrated in FIG. 1.

As illustrated in FIG. 2, the second arm base 14 is equipped with a hollow portion that penetrates along the fourth axis D.

The first wrist element 10 is supported so as to be rotatable about the fourth axis D relative to the second arm base 14.

The first wrist element 10 is equipped with a first portion 15, a second portion 16, and a third portion 17 serially connected along the fourth axis D. The first portion 15 is installed inside the hollow portion of the second arm base 14 so as to be rotatable about the fourth axis D by a bearing 38. The second portion 16 supports the second wrist element 11 so that the second wrist element 11 can rotate about the fifth axis E.

Figure 3:
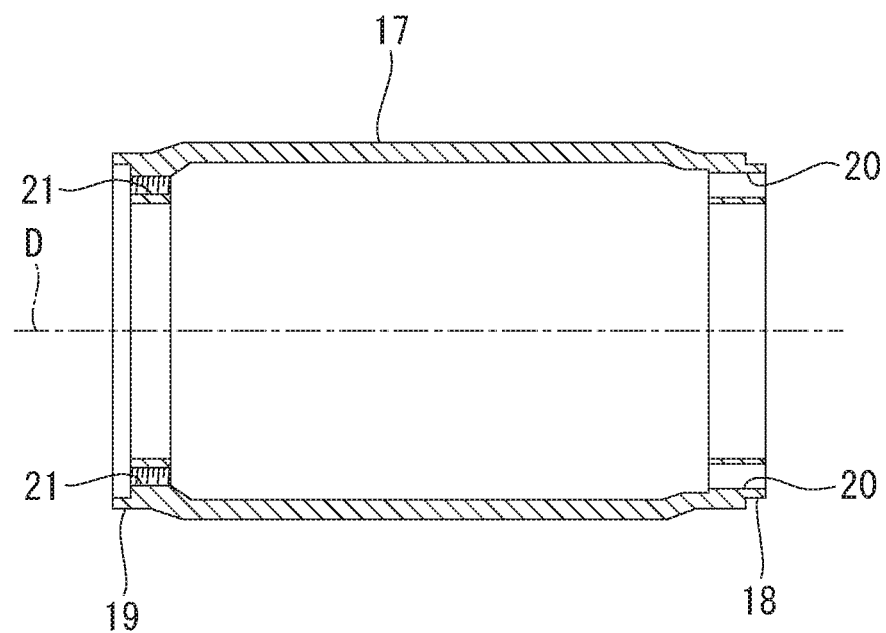
FIG. 3 is a vertical sectional view of a third portion constituting a first wrist element of the wrist unit illustrated in FIG. 2.

The third portion 17 is disposed between the first portion 15 and the second portion 16 and is bolted to the first portion 15 and the second portion 16. As illustrated in FIG. 3, flanges 18 and 19 having an inner flange shape and projecting radially inward are respectively formed at two ends of the third portion 17, through holes 20 are formed in the flange 18, and screw holes 21 are formed in the flange 19.

A hollow first wrist element 10 constituted by the first portion 15, the second portion 16, and the third portion 17 serially connected to one another can be formed by fastening bolts, which pass through through holes 22 in the first portion 15, to the screw hole 21 in the flange 19 in the third portion 17 and fastening bolts, which pass through the through holes 20 in the flange 18, to screw holes 23 in the second portion 16. The outline of the first wrist element 10 can be made flat and free of protrusions by having the flanges 18 and 19 project radially inward. In the drawing, reference sign 10A denotes the hollow portion of the first wrist element 10.

In this embodiment, the third portion 17 has a cylindrical shape and is manufactured by machining by a lathe process (friction reducing treatment). As a result, the inner circumferential surface of the third portion 17 forms a smooth cut surface, and the friction coefficient is suppressed to a sufficiently low level.

The cylindrical space defined by the second arm base 14 and the first portion 15 of the first wrist element 10 is sealed with an oil seal 24 to constitute a gearbox 25. A ring-shaped gear 26 that meshes with a gear (not illustrated) mounted onto the fourth motor 13 that drives the first wrist element 10 is fixed to the first portion 15. Meshing with the gear 26 is lubricated with grease sealed inside the space. The rotation of the fourth motor 13 is reduced by a gear ratio, and the first portion 15 is rotated at a large torque.

As illustrated in FIG. 2, motors 27 and 28 for driving the second wrist element 11 and the third wrist element 12 are placed in the inner space of the second portion 16 of the first wrist element 10.

A hollow portion 30 to be closed by a lid member 29 is disposed behind the gearbox 25 of the second arm base 14. A cylindrical sleeve member (cylindrical member) 31 that extends along the fourth axis D and is radially inwardly separated from the first wrist element 10 with a gap therebetween is fixed to the lid member 29. The sleeve member 31 is integrally manufactured by extrusion molding.

The sleeve member 31 extends from the lid member 29 behind the first portion 15 and penetrates through the radially inward side of the first portion 15 and the third portion 17, i.e., is inserted along the fourth axis D into the hollow portions 10A and 30, and the distal end thereof is supported by an oil seal (first seal member) 32 inside the second portion 16 so that the distal end can rotate about the fourth axis D.

In this manner, the hollow portion 30 behind the gearbox 25 of the second arm base 14 communicates with the inner space of the second portion 16, i.e., the hollow portion 10A, via cylindrical gaps between the first portion 15 and the sleeve member 31 and between the third portion 17 and the sleeve member 31.

As illustrated in FIG. 1, a through hole 35 through which a wire 34 passes is formed in the lid member 29 by using a connector 33, and, as illustrated in FIG. 2, the wire 34 that has penetrated through the through hole 35 is fixed to the lid member 29 with a mounting bracket 36.

As illustrated in FIG. 2, the wire 34, which passes through the through hole 35 in the lid member 29 and extends into the hollow portion 30 of the second arm 5, is branched into two in the hollow portion 30. Each of the branches of the wire 34 is made to pass through a cylindrical space between the first portion 15 and the sleeve member 31.

Each of the branches of the wire 34 is given tendency to undulate so as to be in a loose state, is disposed along the outer circumferential surface of the sleeve member 31, and is fixed to the second portion 16 with a mounting bracket 37. The wire 34 is connected to the two motors 27 and 28 that drive the second wrist element 11 and the third wrist element 12 and are inside the inner space of the second portion 16.

A space for installing an operation tool controller, such as a welding wire feeder, is provided at a position indicated by a two-dot chain line X in FIG. 1 behind the second arm base 14. A welding wire, a cable, a pipe, and the like (not illustrated) extending to an operation tool pass through the space inside the sleeve member 31 and are guided to the distal end of the wrist 6 near the fourth axis D.

The effects of the industrial robot 1 according to this embodiment having the aforementioned structure will now be described.

With the industrial robot 1 according to this embodiment, when the first wrist element 10 is rotated about the particular axis D relative to the second arm 5, the distal end of the wire 34 fixed to the second portion 16 of the first wrist element 10 rotates about the axis D together with the first wrist element 10. Since the wire 34 has an extra length that enables relative rotation between the second arm 5 and the first wrist element 10, the change in path length resulting from the relative rotation between the second arm 5 and the first wrist element 10 is absorbed within the range of the extra length, and thus the connected state can be maintained.

In this case, the inner circumferential surface of the third portion 17 serially connected between the first portion 15 and the second portion 16 of the first wrist element 10 is formed as a smooth cut surface by being machined by a lathe process, and thus the friction coefficient is suppressed to a sufficiently low level. This offers an advantage in that even when the third portion 17 is inserted between the first portion 15 and the second portion 16, thereby sufficiently extending the reach from the third axis C to the distal end of the wrist 6 and increasing the weight of the wire 34, wear of the wire 34 can be reduced.

With the industrial robot 1 according to this embodiment, since the distal end of the sleeve member 31 is rotatably sealed with the oil seal 32 inside the second portion 16 of the first wrist element 10, entry of dust and the like into the gap between the first wrist element 10 and the sleeve member 31 can be prevented.

Since the gap between the second arm 5 and the first wrist element 10 is also relatively rotatably sealed with an oil seal (second seal member) 24 and an oil seal (third seal member) 39, entry of dust and the like into the gap between the second arm 5 and the first wrist element 10 can be prevented.

Since the sleeve member 31 is manufactured by extrusion molding, the outer circumferential surface of the sleeve member 31 can be made smooth, wear can be suppressed even when the moving wire 34 contacts the outer circumferential surface, and an appropriate state can be maintained.

In this embodiment, a friction reducing process that forms a smooth inner circumferential surface of the third portion 17 by machining is employed; alternatively, a coating formed of a material having a smaller friction coefficient than the material for the first wrist element 10 may be provided. An example of the coating for reducing friction is an ethylene tetrafluoride coating.

Figure 4:
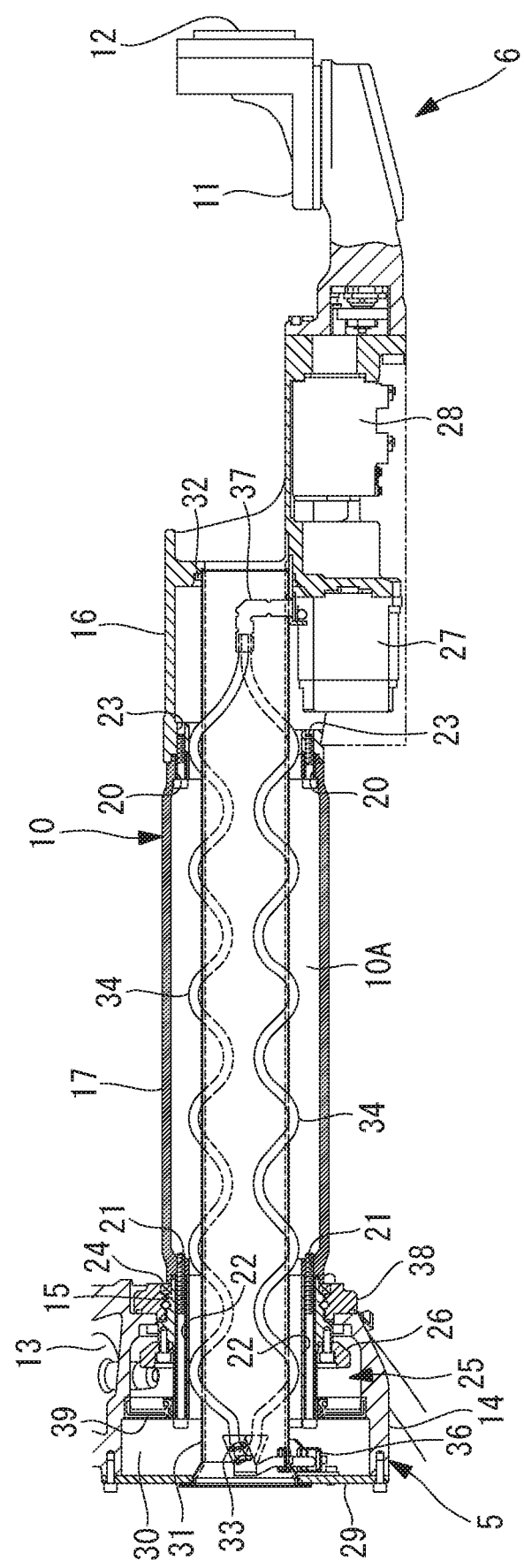
FIG. 4 is a partial vertical sectional view of a second arm and a wrist unit of a modification of the industrial robot illustrated in FIG. 1.
Figure 5:
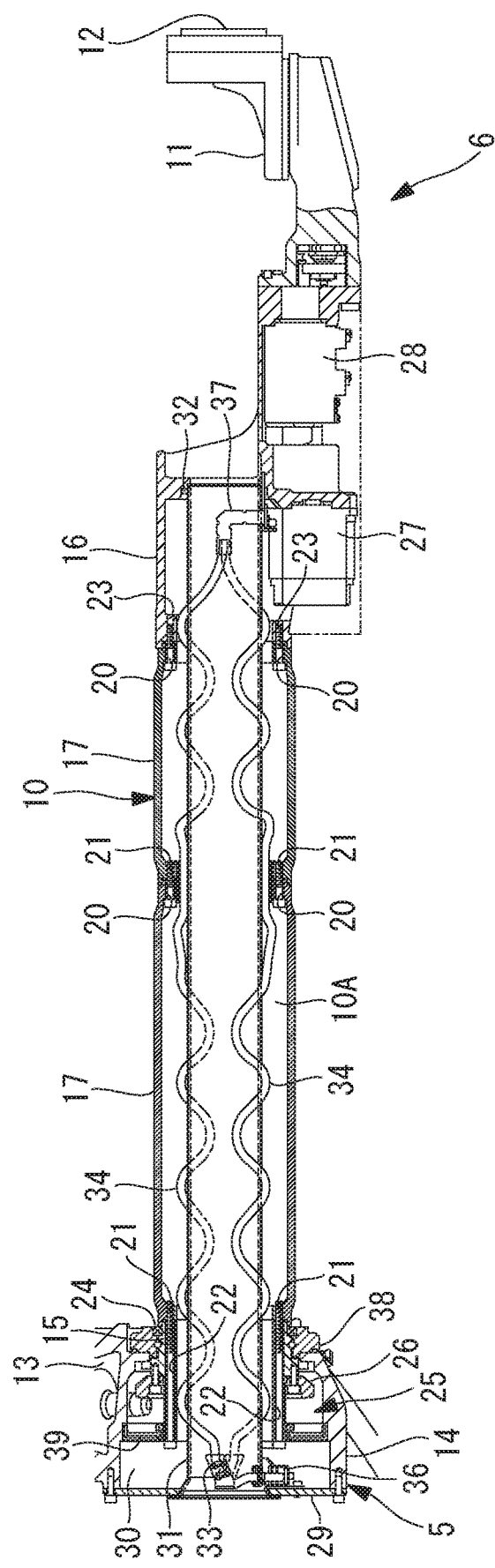
FIG. 5 is a partial vertical sectional view of a second arm and a wrist unit of another modification of the industrial robot illustrated in FIG. 1.

In this embodiment, one third portion 17 is connected between the first portion 15 and the second portion 16; alternatively, as illustrated in FIG. 4, a portion having a different length can be employed as the third portion 17 or, as illustrated in FIG. 5, two or more third portions 17 may be serially connected.

When two or more third portions 17 are to be connected and used, flanges 18 and 19 having an inner flange shape and projecting radially inward may be respectively formed at two ends of each of the third portions 17, through holes 20 may be formed in the flange 18, and screw holes 21 may be formed in the flange 19. In this manner, a long third portion 17 can be formed by simply aligning the through holes 20 of one third portion 17 and the screw holes 21 of another third portion 17 and fastening bolts passing through the through holes 20 to the screw hole 21.

The outline of the first wrist element 10 can be made flat and free of protrusions by having the flanges 18 and 19 project radially inward. Meanwhile, since the gap between the inner surface of the third portion 17 and the sleeve member 31 becomes locally narrow at the connecting portions of the flanges 18 and 19, ring-shaped protective members for reducing wear caused by the contact with the wire 34 are preferably installed. Examples of the protective members include those composed of a material having a low friction coefficient, such as ethylene tetrafluoride.

Next, a method for extending the reach of the industrial robot 1 according to one embodiment of the present disclosure is described.

Figure 6:
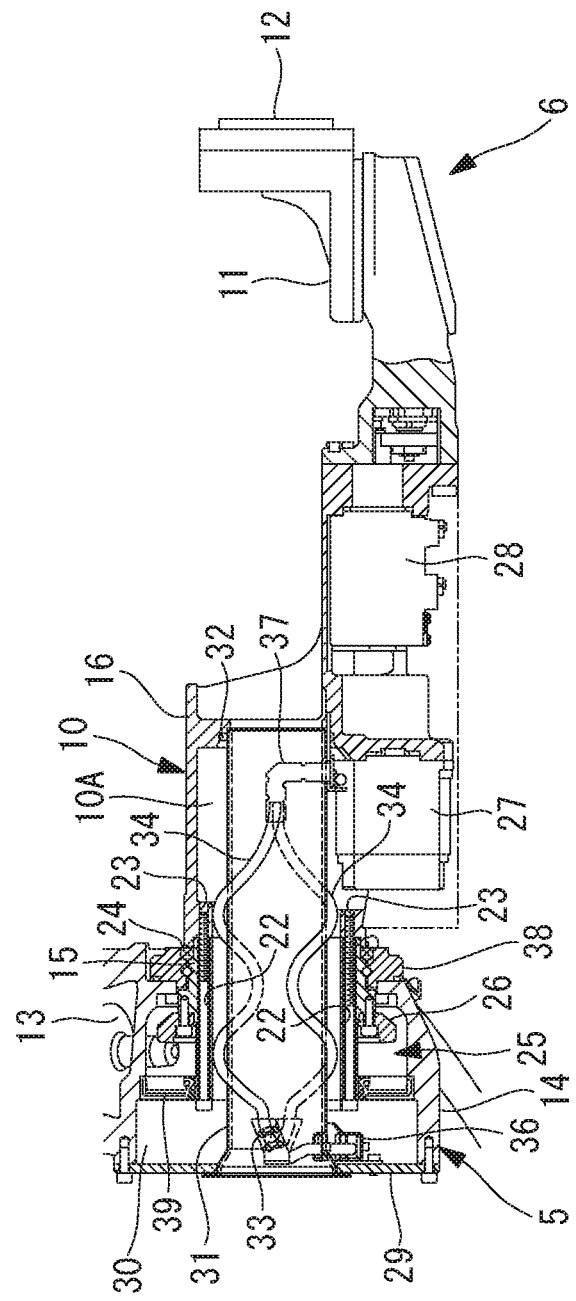
FIG. 6 is a partial vertical sectional view of a second arm and a wrist unit of an industrial robot in a shortest reach state, and is a view that illustrates a method for extending the reach of an industrial robot according to one embodiment of the present disclosure.

The reach extending method according to this embodiment involves, for example, extending the reach from the state illustrated in FIG. 6, i.e., the state in which the first wrist element 10 of the industrial robot 1 has the first portion 15 and the second portion 16 directly connected to each other.

Figure 7:
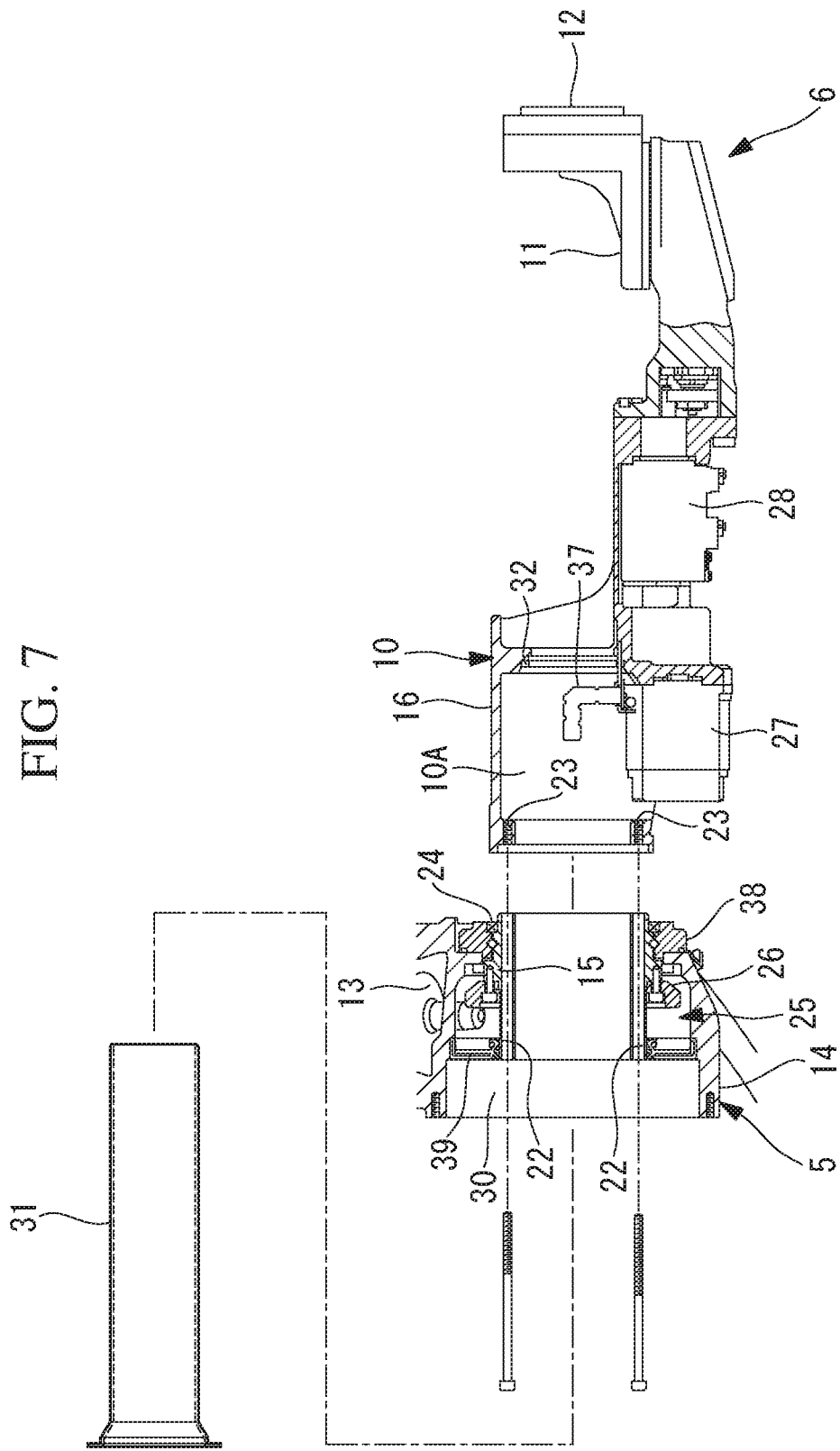
FIG. 7 is a vertical sectional view illustrating a state in which a second arm and a wrist element illustrated in FIG. 6 are disconnected and a sleeve member is removed.

In this reach extending method, first, the wire 34 is disconnected from the motors 27 and 28 for driving the second wrist element 11 and the third wrist element 12, and the mounting bracket 37 that fixes the wire 34 to the second portion 16 is released to unfix the wire 34. Next, as illustrated in FIG. 7, the bolts connecting the first portion 15 and the second portion 16 are removed to disconnect the two portions, and then the sleeve member 31 is removed from the lid member 29 behind the second arm 5. Then, the wire 34 fixed to the lid member 29 with the mounting bracket 36 is removed.

Figure 8:
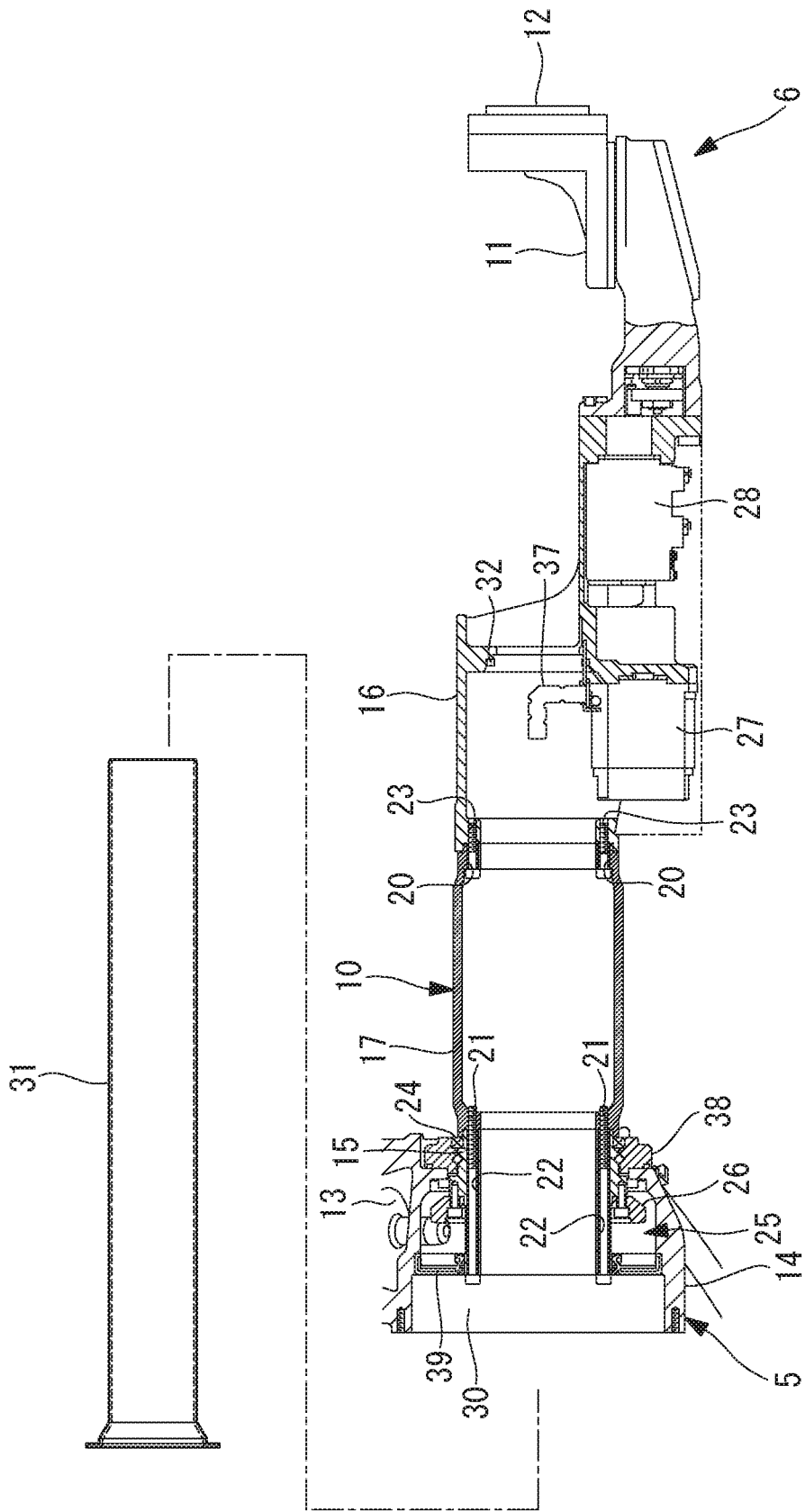
FIG. 8 is a vertical sectional view illustrating a state in which a third portion is connected between a first portion and a second portion illustrated in FIG. 7, and a longer sleeve member is inserted.

Subsequently, as illustrated in FIG. 8, a cylindrical third portion 17 having an inner circumferential surface subjected to a friction reducing process is placed between the first portion 15 and the second portion 16 of the first wrist element 10, and is serially connected to these portions in the axis D direction by fastening bolts. Next, the sleeve member 31 is replaced with another sleeve member 31 that is longer than the former sleeve member 31 by the length of the third portion 17, and the wire 34 is replaced by a new wire 34 longer than the third portion 17. As a result, as illustrated in FIG. 2, an industrial robot 1 having an extended reach compared with the industrial robot 1 illustrated in FIG. 6 is easily configured.

With the reach extending method according to this embodiment, as illustrated in FIG. 4, the reach can be easily changed by having ready a third portion 17, a sleeve member 31, and a wire 34 that have different lengths.

When two or more third portions 17 are to be combined, the third portions 17 to be combined may have the same length or, as illustrated in FIG. 5, different lengths. As a result, an industrial robot 1 having a varying reach can be easily configured.

The invention claimed is:

1. An industrial robot comprising:
   a first member and a second member that are supported so as to be relatively rotatable about a predetermined axis, the first member and the second member each comprise a hollow portion extending along the axis;
   a cylindrical member inserted into the hollow portions of the first member and the second member along the axis, and fixed to the first member; and
   a wire disposed in a cylindrical gap between the cylindrical member and the first member, the gap also being made between the cylindrical member and the second member so as to extend along an outer circumferential surface of the cylindrical member, the wire having an extra length that enables relative rotation between the first member and the second member and having a first end fixed to the first member and a second end fixed to the second member,
   wherein the second member includes a first portion rotatably supported by the first member, a second portion to which the second end of the wire is fixed, and a cylindrical third portion serially connected between the second portion and the first portion along the axis direction,
   the third portion has an inner circumferential surface that faces the gap and has been subjected to a friction reducing process for reducing friction with the wire,
   the third portion is detachably attached between the first and second portions,
   flanges are respectively provided at two ends of the third portion, and
   a cross-section of the third portion is larger, in diameter, than a cross-section of each of the flanges.

2. The industrial robot according to claim 1, wherein the friction reducing process involves machining the inner circumferential surface of the second member.

3. The industrial robot according to claim 1, wherein the friction reducing process involves coating the inner circumferential surface with a material having a friction coefficient smaller than a material for the second member.

4. The industrial robot according to claim 1, further comprising a first seal member that seals a space between the second member and the cylindrical member so that the cylindrical member can rotate relative to the second member.

5. The industrial robot according to claim 1, further comprising a second seal member that seals a space between the first member and the second member.

6. The industrial robot according to claim 1, wherein the third portion includes two or more members connected in an axis direction.

7. The industrial robot according to claim 1, wherein the cylindrical member is an extrusion-molded product.

8. The industrial robot according to claim 1, wherein the flanges have an inner flange shape projecting radially inward.

9. The industrial robot according to claim 8, wherein one of the flanges has at least one through hole, and another one of the flanges has at least one screw hole.

* * * * *